P. H. ZIMMER.
STARTING DEVICE FOR ELECTRIC MOTORS.
APPLICATION FILED JAN. 25, 1919.

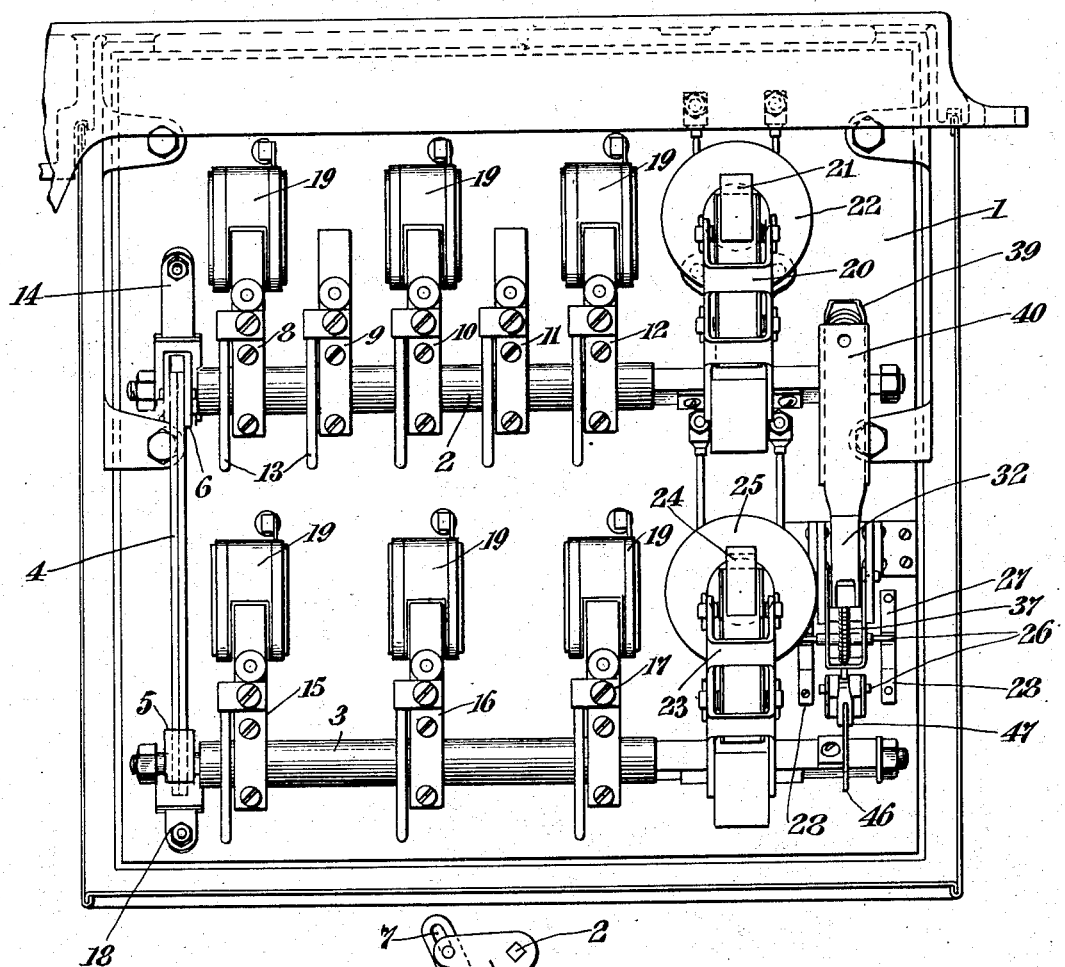
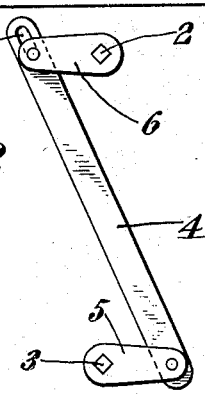

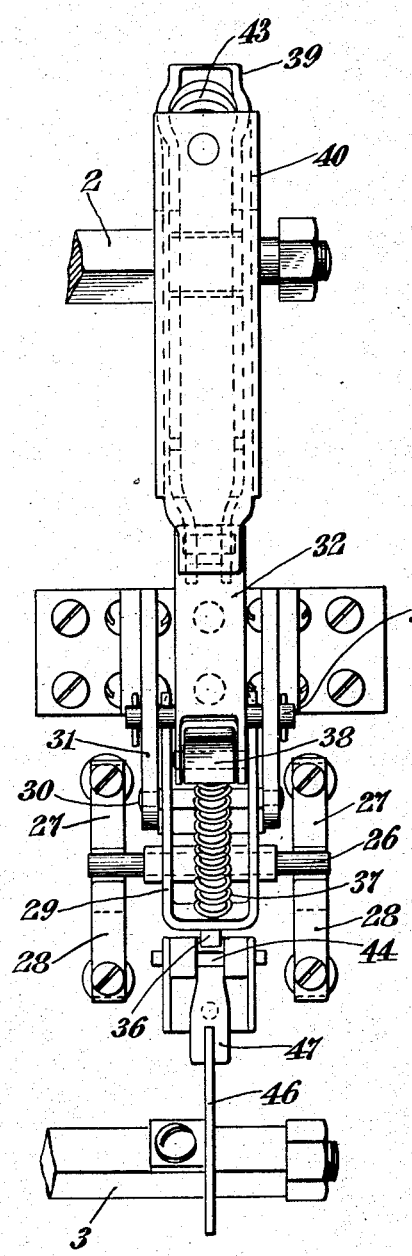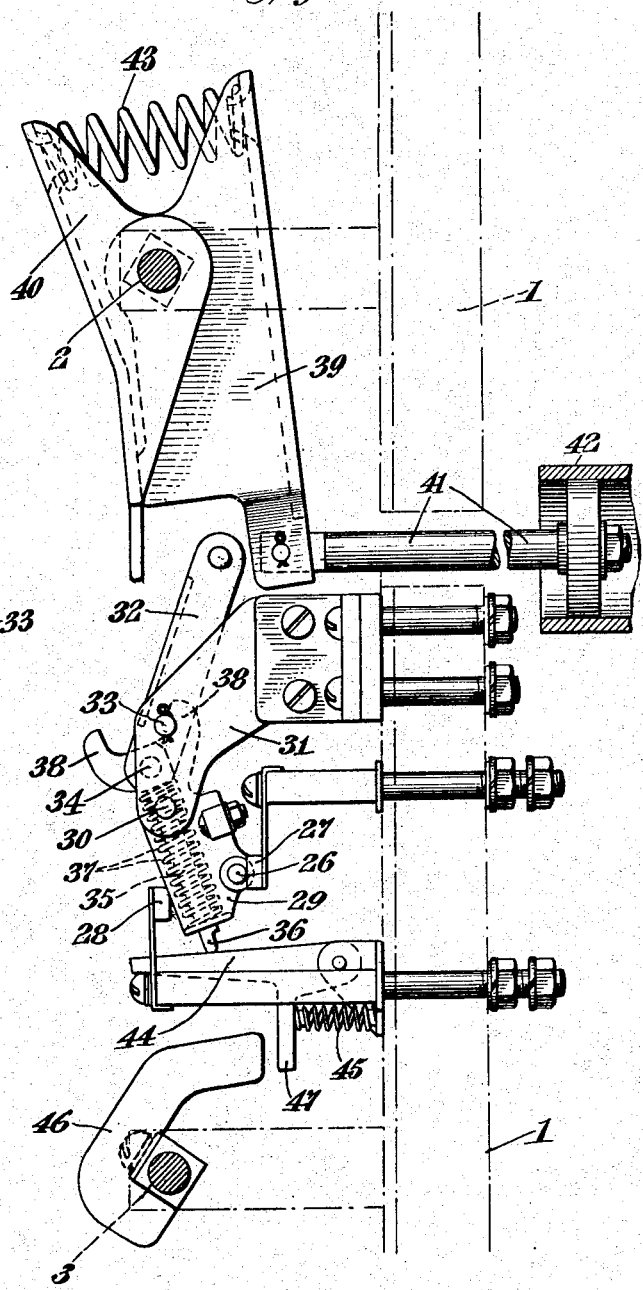

1,343,022.

Patented June 8, 1920.

Inventor:
Paul H. Zimmer,
by Albert G. Davis
His Attorney.

UNITED STATES PATENT OFFICE.

PAUL H. ZIMMER, OF SCHENECTADY, NEW YORK, ASSIGNOR TO GENERAL ELECTRIC COMPANY, A CORPORATION OF NEW YORK.

STARTING DEVICE FOR ELECTRIC MOTORS.

1,343,022. Specification of Letters Patent. Patented June 8, 1920.

Application filed January 25, 1919. Serial No. 273,155.

*To all whom it may concern:*

Be it known that I, PAUL H. ZIMMER, a citizen of the United States, residing at Schenectady, county of Schenectady, State of New York, have invented certain new and useful Improvements in Starting Devices for Electric Motors, of which the following is a specification.

My invention relates to improvements in starting devices for electric motors, and particularly starting devices for alternating-current motors.

One of the objects of my invention is to provide means for automatically starting the motor, with suitable transformer or compensator coils in circuit to give a reduced voltage, and after the motor has been allowed to come up to speed, connect the motor directly with the line, cutting out the compensator coils or other protective devices.

In a particular embodiment of my invention I start the motor by connecting the same through a suitable compensator, and after the motor has come up to speed, disconnect the compensator and connect the motor directly to the line.

For the purpose of disclosing my invention, I have illustrated one embodiment thereof in the accompanying drawings, in which:

Figure 1 is a front elevation of a switch embodying my invention;

Fig. 2 is an end elevation of the switching mechanism illustrated in Fig. 1;

Fig. 3 is a detail elevation of the timing mechanism for the switch;

Fig. 4 is a side elevation of the mechanism illustrated in Fig. 3, and

Figure 5:
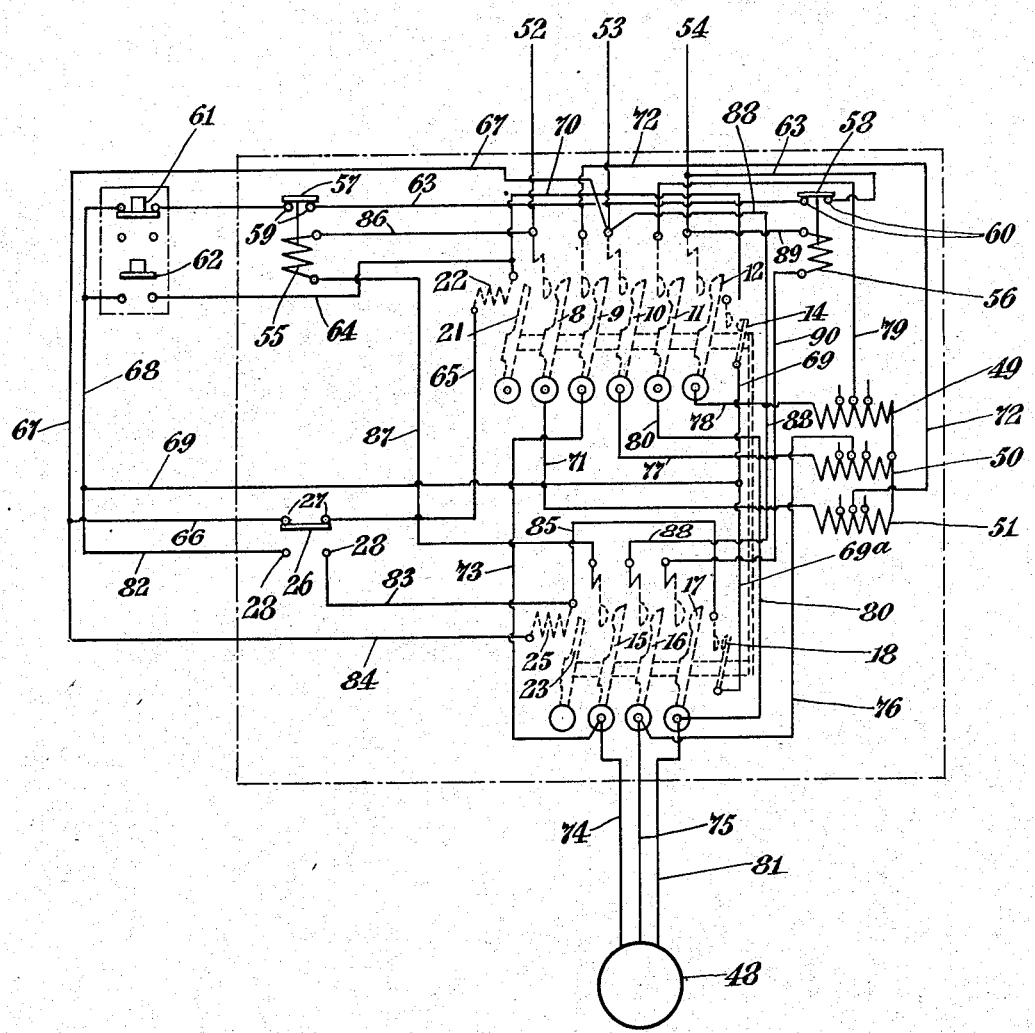
Fig. 5 is a diagrammatic view of the circuit connections of the switch.

As illustrated in the drawings, I provide an insulating base 1 upon which are mounted a pair of rocking shafts 2 and 3 covered with suitable insulation and carrying operating switches. These two shafts are connected by an interlock, which operates to prevent one shaft from being rocked to close its switches when the switches of the opposite shaft are closed. This interlock comprises a link 4, which is connected at its opposite ends to oppositely disposed crank arms 5 and 6, respectively, on the shafts 3 and 2, the link being provided with openings at its ends through which pass pins on the crank arms. The opening 7 at the upper end of the link is elongated, so as to permit a certain amount of independent movement of the respective shafts. It will be seen, however, that when the shaft 2 is rocked to a closed position, the pin of the crank arm thereof has moved in the slot to a position where the shaft 3 is locked against movement, so that this shaft can not be rotated to close its switches. Likewise, when the shaft 3 is rocked to close its switches, the pin in the slot is moved to such a position that the shaft 2 can not be moved to close its switches; in other words, when the switches of one shaft are closed the switches of the opposite shaft are interlocked open.

Mounted upon and moving with the shaft 2 is a series of motor control switches 8, 9, 10, 11 and 12, adapted to engage, when closed, suitable contacts on the face of the base 1 and having lead wires 13 connected therewith. An interlock switch 14 is also mounted upon and moves with the shaft 2. Similar motor control switches 15, 16 and 17 are mounted upon and move with the shaft 3 and a similar electrical interlock switch 18 is also mounted upon and moves with this shaft. For disrupting the arcs caused by the opening of switches 8, 10, 12, 15, 16 and 17 I provide the usual blow-out magnets 19, which are of the usual construction and have their poles surrounding the contacting portion of the switches in such a position as to magnetically blow out the arc when these switches are opened. The shaft 2 is rocked by a lever 20 mounted on one end of the shaft and carrying the armature 21 of an operating magnet 22. The shaft 3 is likewise rocked by a lever 23 carrying an armature 24 of a second operating magnet 25.

The circuit through these magnets is controlled by a switch 26 adapted to be moved to bridge either a pair of contacts 27 or a pair of contacts 28, which, respectively, are connected in the circuit of the magnets 22 and 24. This switch 26 is mounted upon the lower end of a rocking arm 29 pivoted on a pin 30 extending between a pair of supports 31 secured on the front face of the base 1. The arm 29 is rocked on its pivot by means of a lever 32 pivoted at 33 between the supports 31 and connected at its lower end by a pin 34 to the head of a bolt 35, the lower end of which extends through the bottom of the arm 29 and forms a trigger 36. Surrounding the bolt 35 is a coiled spring 37, the bottom of which bears upon the bottom of the arm 29 and the top of which bears against a shoulder formed on the bolt 35. The pivotal connections of the levers 29 and 32 form a toggle joint, and due to this arrangement the spring 37 always exerts a tendency to move the switch 26 into engagement with the contacts 27. At the top of the arm 29 I provide a pair of limit stops 38 which are adapted to engage the shaft 23 and limit the movement of the switch 26 in either direction.

Mounted upon the shaft 2 is a pair of levers 39 and 40, the lever 39 being free to rock on the shaft independently thereof and the lever 40 being connected to and rocking with the shaft. The lower end of the lever 39 is connected by a link 41 with the piston of a retarding dash-pot 42, and as the lower end of the lever moves to the left—viewing the structure as illustrated in Fig. 4—it engages the top of the lever 32, throwing the switch arm 26 out of engagement with the contacts 27 and into engagement with the contacts 28. As before stated, the lever 40 is connected to and moves with the shaft 2, so that as the shaft is rocked the upper end of this lever is moved and compresses the coiled spring 43 interposed between the upper end of the lever 40 and the lever 39, thereby placing the spring under compression to impart movement to the lever 39, this movement, however, being retarded by the dash-pot 42. When the arm 29 is moved to throw the switch contact 26 into engagement with the contacts 28, a latch 44 is moved to engage the trigger 36 by a spring 45 to hold the arm in this position. When, however, the shaft 3 is rocked to close its switches, a lever 46 mounted upon and rocking with the shaft engages a projection 47 on the latch 44, kicking the same loose from the trigger 36 and allowing the arm 29 to spring back and the switch 26 to bridge the contacts 27.

The mechanical operation of the parts thus far described is as follows: Assuming that the timing mechanism is in the position illustrated in Figs. 3 and 4 and that the switches of both shafts are open, if the circuit through the magnet 22, which circuit is controlled by the contacts 27, is closed, then the magnet 22 will attract its armature 21, rocking the shaft 2 to close the switches carried thereon. At the same time the pin moves in the opening 7 of the link to such a position that the shaft 3 is locked against rocking to close its switches. The rocking of the shaft 2 operates the lever 40 to compress the spring 43; therefore, pressure is exerted upon the upper end of the lever 39 to cause said lever to rock. This rocking movement of the lever 39, however, is retarded by the dash-pot, so that the movement of the lever 39 is slow irrespective of the rapidity of movement of the shaft 2 in closing the switches. The lower end of the lever 39, as it is rocked, engages the upper end of the lever 32, moving it outwardly, and by the time the lever 39 has completed its movement the arm 29 will have been swung to a position to disconnect the switch 26 from the contacts 27 and cause the switch 26 to engage the contacts 28. When the lever 29 is moved to this position the catch 44 springs up and engages the trigger 36, holding the switch 26 closed on the contacts 28. The moving of the switch 26 off the contacts 27 opens the circuit through the magnet 22 and the engaging of the switch 26 with the contacts 28 closes the circuit through the magnet 25. The circuit through the magnet 22 being opened, the switches on the shaft 2 are free to drop back to their open position, and at the same time the magnet 25, attracting its armature 24, rocks the shaft 3 to close the switches thereon. The rocking of the shaft 3 to close the switches also rocks the arm 46, which in turn engages the lug 47 on the latch 44, disconnecting the latch from the trigger 36 and allowing the switch 26 to spring back to normal position, at the same time moving the switch 26 out of contact with the contacts 28 and opening the circuit at this point through the magnet 25.

It is thus seen that the mechanism illustrated in Figs. 3 and 4 performs the function of a timing mechanism for regulating the time between the operation of the switches on the shaft 2 and the switches on the shaft 3, insuring operation of the switches in their proper sequence and at the same time insuring a sufficient lapse of time between the closing of the switches on the shaft 2 and the switches on the shaft 3.

Referring to the diagrammatic view illustrated in Fig. 5, the motor is shown at 48. The compensating coils for this motor are shown at 49, 50 and 51. The motor is connected in a three-wire system, the mains of which are shown at 52, 53 and 54, and arranged to be connected in the motor circuit is a pair of overload magnets 55 and 56, controlling moving contacts 57 and 58 adapted to bridge the contacts 59 and 60, respectively.

For the purpose of controlling the operation of the switch I provide a pair of push-button switches, one, 61, for stopping the motor and the other, 62, for starting the motor. These switches may be arranged at any convenient point and, if desired, may be mounted at some distance from the starting mechanism.

In operation, we will assume that the parts are in normal position and that the switch 62 has been closed. The switch 61 being normally closed, circuit is thereby closed from the line 54 by the conductor 63, across the switches 58 and 57, through the switch 61, thence through the switch 62, by conductor 64, through the winding of the magnet 22, thence by conductor 65, across the contact 26, which, it will be remembered, is in engagement with the contacts 27, and by conductors 66 and 67 to the neutral wire 53 of the line. The magnet 22 is thus energized and attracts its armature 21, closing the switches 8 to 12, inclusive, and the switch 14. When the switch 14 is closed, a parallel circuit for the magnet 22 is closed from the conductor 63, through conductors 68 and 69, across switch 14, by way of conductor 70, through the winding of the magnet 22, and thence by conductors 65 and 67 back to the neutral side of the line. It is thus seen that the switch 62 is bridged and that the magnet will continue to operate even though this switch is released and allowed to again open; in other words, the switch 62 needs to be momentarily closed only.

When the switches 8 to 12, inclusive, are closed, the motor circuit is closed through the compensating coils 49, 50 and 51, as follows: from line 52 across switch 8, by conductor 71 through compensating coil 51, which, it will be noted, is an adjustable coil; by conductor 72 across switch 9, by conductors 73 and 74 through the motor 48 and back on conductors 75 and 76, through compensating coil 50, conductor 77, and across switch 10 to the neutral side 53 of the line. At the same time circuit is closed from the opposite side 54 of the line across switch 12, by conductor 78 through the compensating coil 49, by conductor 79 across switch 11, thence by conductors 80 and 81 through the motor 48 and back to the neutral side 53 of the line by the way of conductor 75, etc. The motor is thus started with the compensating coils 49, 50 and 51 in circuit. The motor, however, soon builds up in speed, and it will be remembered that the lever 39 is being moved under the influence of the coiled spring 43, it being, however, retarded by the dash-pot 42, so that eventually the switch 26 is moved off the contacts 27 and bridges the contacts 28. As soon as this occurs, the magnet 22 is deënergized, thereby permitting the switches 8 to 12 to drop open and the magnet 25 is energized, rocking the shaft 3. The circuit for this magnet is closed from the conductor 68 by the way of conductor 82, across the contacts 28, conductor 83, through the winding of the magnet 25, and thence by conductors 84 and 67 to the neutral side 53 of the line. When the shaft 3 is rocked and closes the switches 15, 16 and 17, the switch 18 is also closed, and a parallel circuit through the magnet is closed by the way of conductors 63, 68, 69 and 69ª, through the switch 18, and thence by conductor 85 through the winding of the magnet 25, and by conductors 84 and 67 to the neutral side, thereby paralleling the circuit controlled by the contacts 28, because it is to be remembered that when the shaft 3 is rocked to close the switches mounted thereon the trigger 36 of the arm controlling the switch 26 is released and the arm swings back, so that the contact 26 again bridges the contacts 27, opening the circuit through the magnet 25 at this point. When the switches 15, 16 and 17 are closed, circuit is established, cutting out the compensating coils 49, 50 and 51, as follows: from the line 52, by the way of conductor 86 through the winding 55 of the overload, thence by conductor 87 across switch 15 and by conductor 74 to the motor, returning by the way of conductor 75 across switch 16 and by conductor 88 to the neutral wire 53 of the line. The opposite side 54 of the line is connected by conductor 89 through the overload winding 56, thence by conductor 90 across switch 17 and by conductor 81 to the motor, thence back to the neutral side by conductor 75, across switch 16, etc. The motor thus continues to run under full current conditions until the switch 61 is opened, in which event the circuit through the magnet 25 is immediately opened and the switches 14, 15 and 17 allowed to drop back in open position, thereby stopping the motor. The switch 61 will then immediately be released and allowed to move back to its normally closed position again, and due to the fact that the switch 18 is opened the circuit through the magnet 25 will not be again closed. In event of an overload, of course, either one of the switches 57 or 58 would be opened, thereby opening the circuit through the magnet 25 and permitting the parts to drop back in open-circuit conditions, just described.

What I claim as new and desire to secure by Letters Patent of the United States, is:

1. The combination with two sets of switches, of electromagnets for operating each of said sets, a switch for controlling the circuit through said electromagnets and having a normal tendency to maintain the circuit through the magnet of the first set of switches closed and the magnet of the second set of switches open, a time element device operated by the closing of the first set of switches for operating said switch to open the circuit through the magnet of the first set of switches and close the circuit through the magnet of the second set of switches, and means governed by the second set of switches for maintaining said switch in said position until the second set of switches is closed.

2. The combination with two sets of switches, of electromagnets for operating each of said sets, a switch for controlling the circuit through said electromagnets, a time element device operated by the closing of said first set of switches for operating said switch to open the circuit through the electromagnet of the first set of switches and close the circuit through the electromagnet of the second set of switches, and a mechanical connection between the second set of switches and said switch for causing said switch to reverse its movement upon the closing of the second set of switches.

3. The combination with two sets of switches, of electromagnets for operating each of said sets, a switch for controlling the circuit through said electromagnets, a spring placed under tension by the closing of said first set of switches operating said switch to open the circuit through the magnet of the first set of switches and close the circuit through the magnet of the second set of switches, a dash-pot for retarding the action of said switch, and means operated by the closing of said second set of switches for reversing the action of said switch.

4. The combination with two sets of switches, of electromagnets for controlling each set, a switch for controlling the operation of said electromagnets, means tending to normally hold said switch to close the circuit through the electromagnet of said first set of switches, a spring placed under compression by the closing of said first set of switches for operating said switch to open the circuit through the magnet of said first set of switches and close the circuit through the magnet of said second set of switches, a latch for holding the switch in said last mentioned position, a dash-pot for retarding the operation of said switch, and means operated by the closing of said second set of switches for releasing said latch to permit said switch to move to its normal position.

5. The combination with two sets of switches, of electromagnets controlling the operation of each of said sets, a manually operated switch for closing the circuit through the electromagnet of the first set of switches, a switch operated by the closing of the first set of switches for closing a circuit around said manually operated switch, a switch operated by the closing of said first set of switches for opening the circuit through the magnet of said first set of switches and closing the circuit through the magnet of said second set of switches, and a switch operated by the closing of said second set of switches for closing a circuit around said switch.

6. The combination with two sets of switches, of an electromagnet for controlling each of said sets, a manually operated switch for closing the circuit through the electromagnet of the first set of switches, a switch operated by the closing of the first set of switches for closing the circuit around said manually operated switch, a switch controlling the circuit of the electromagnets of both sets of switches and normally maintaining the circuit through the electromagnet of the first set of switches and normally disconnecting the circuit of the electromagnet of the second set of switches, means operated by the closing of the first set of switches for operating said electromagnet-controlling switch to open the circuit of the magnet controlling the first set of switches and close the circuit of the magnet controlling the second set of switches, a switch operated by the closing of said second set of switches for closing the circuit around said magnet-controlling switch, and means operated by the closing of said second set of switches for restoring said magnet-controlling switch to its normal position.

7. The combination with two sets of switches, of electromagnets for operating said switches, manually operated means for closing the circuit through the electromagnet of the first set, means operated by the closing of said first set of switches for maintaining the circuit through said electromagnet independently of said manually operated means, means operated by the closing of said first set of switches for opening the circuit through the electromagnet of said first set and closing the circuit through the electromagnet of said second set, and means operated by the closing of said second set of switches for maintaining the circuit through said electromagnet of the second set of switches independently of said last-mentioned means.

In witness whereof, I have hereunto set my hand this 22nd day of January, 1919.

PAUL H. ZIMMER.